March 13, 1962 J. JOHNSON 3,024,817
ATTACHABLE FIXTURE FOR CONVERTING A MOTOR POWERED
RECIPROCATING SAW INTO A ROUTING TOOL
Filed July 18, 1960 2 Sheets-Sheet 1
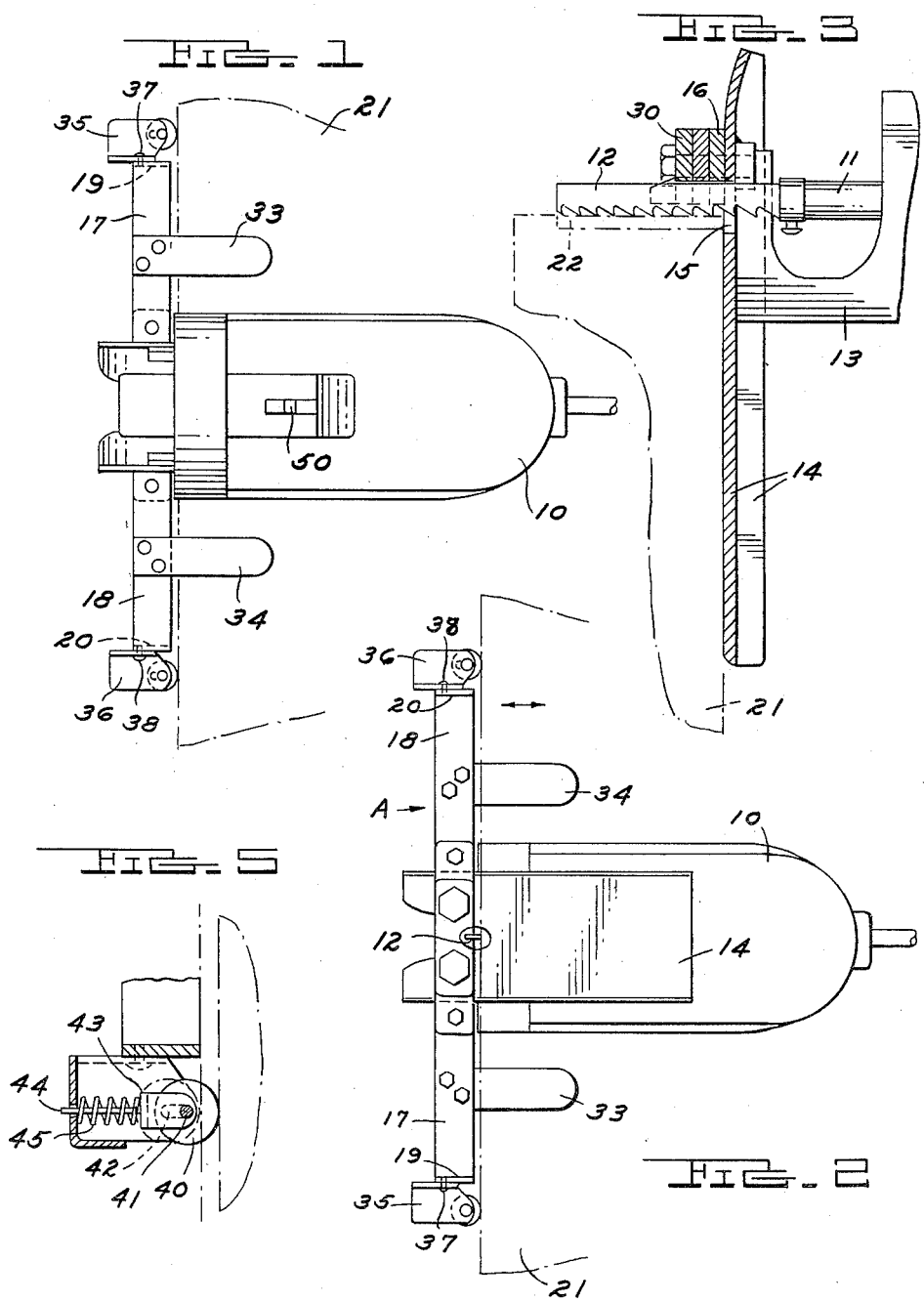
INVENTOR.
JAMES JOHNSON
ATTORNEY

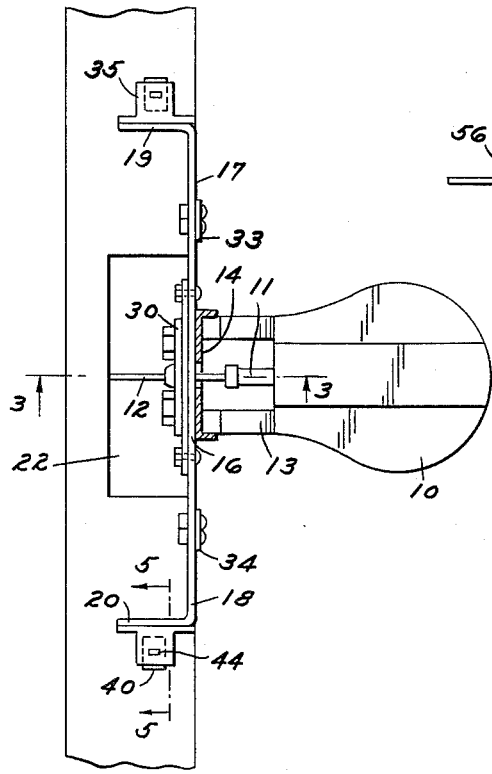
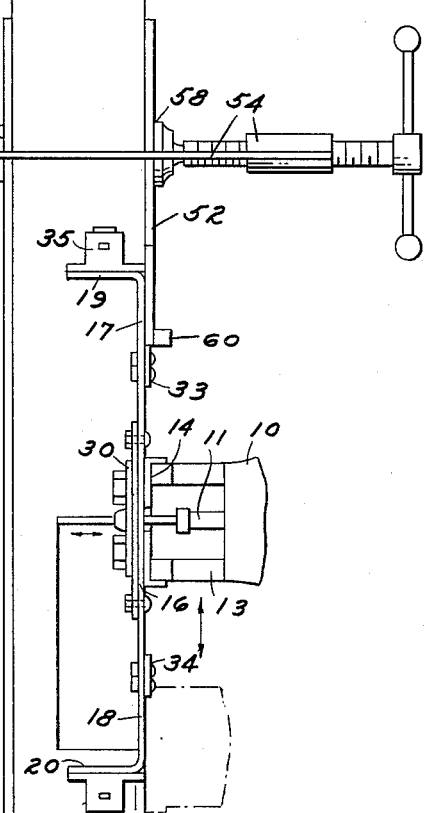
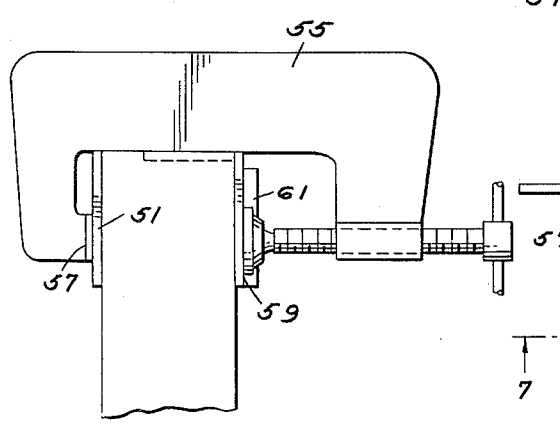
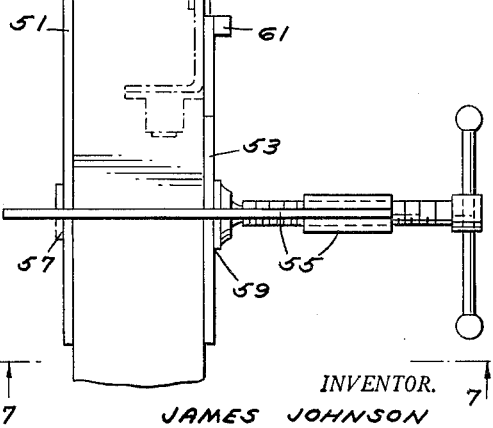

United States Patent Office 3,024,817
Patented Mar. 13, 1962

3,024,817
ATTACHABLE FIXTURE FOR CONVERTING A MOTOR POWERED RECIPROCATING SAW INTO A ROUTING TOOL
James Johnson, 616 Parkdale Ave., Royal Oak, Mich.
Filed July 18, 1960, Ser. No. 43,445
8 Claims. (Cl. 144—27)

This invention relates to routing tools and more particularly pertains to an easily attachable fixture for converting a motor powered reciprocating saw into a routing tool which is accurately controllable as to length, width, and depth of cut.

Power tools and more particularly routing tools have been employed heretofore to facilitate the removal of material in an area with accurate control, however, the several devices of the prior art have not proven entirely satisfactory inasmuch as they are complicated in design and construction, expensive to manufacture, difficult to mount, difficult to use, and lack the facility of quickly and accurately removing the material in the desired area.

With the foregoing in view, the primary object of the invention is to provide a fixture and/or power tool combination which is simple in design and construction, inexpensive to manufacture, easy to use, easy to mount and which accurately and easily controllably removes material from the desired area.

An object of the invention is to provide a combination powered reciprocating saw and guide fixture which is inexpensively manufactured as a component part, is easily made in the assembly and adaptation of the parts readily accomplished and which can be operated with ease by a professional or an amateur.

An object of the invention is to provide an arm having legs projecting on either side of the saw blade for contacting the workpiece as a limit stop after the saw has made the predetermined depth of cut.

An object of the invention is to provide spring-pressed rollers on the leg ends for depressably holding the saw blade above a workpiece surface providing a force opposed to manual pressure moving the saw blade into workpiece surface contact so as to effect easy control of the saw blade as to depth of engagement.

An object of the invention is to provide a lengthwise limit stop fixture for attachment to the workpiece.

An object of the invention is to utilize the various saw lengths and reciprocating extent for the widthwise limitation and control of the area of material removal.

An object of the invention is to provide a slotted bolster plate relative to the saw for supporting the saw during sidewise saw movement to prevent the saw from bending and/or breaking.

These and other objects of the invention will become apparent by reference to the following description of a routing tool fixture and saw combination embodying the invention taken in connection with the accompanying drawings in which:

FIG. 1 is a top-plan view of the routing fixture and saw combination showing a workpiece in dotted lines.

FIG. 2 is a bottom-plan view of the device seen in FIG. 1.

FIG. 3 is an enlarged partial cross-sectional view of the device seen in FIG. 1 taken on the line 3—3 of FIG. 4.

FIG. 4 is an end-elevational view of the device seen in FIG. 1 taken from the left side thereof showing the workpiece in solid lines.

FIG. 5 is a cross-sectional view of the adjustable spring-pressed roller guide taken on the line 5—5 of FIG. 4.

FIG. 6 is a view similar to FIG. 4 with the motor housing broken away and showing in addition thereto the motor and guides at one end of the area of material removal in solid lines and showing the same in dotted lines at the other end of the area of material removal; and FIG. 7 is a cross-sectional view of FIG. 6 taken on the line 6—6 thereof.

Referring now to the drawings wherein like numerals refer to like and corresponding parts throughout the several views, the power saw, routing fixture, and guides disclosed therein to illustrate the invention comprise a motor housing 10 having a reciprocating saw holding arm 11, a saw 12 mounted in the arm 11, a spacer yoke 13 carried by the motor housing 10, a guide plate 14 mounted on the yoke 13 having an aperture 15 through which the saw 12 projects and reciprocates, a routing fixture cross-bar 16 secured to the plate 14 and/or directly to the yoke 13 having opposite legs 17 and 18 projecting sidewise outwardly on either side of the saw blade 12 respectively terminating in right angle feet 19 and 20 for slidably abutting the face of the workpiece 21 so that upon the user placing the plate 14 against the side face of the workpiece 21 and bringing the saw 12 downwardly thereon, lightly engaging the same, and moving the same sidewise until an amount of material is removed gaged by the feet 19 and 20 contacting the edge face of the workpiece and, it will be observed, that the material in the area 22 is removed by the saw blade 12 during reciprocating powered movement and manual sidewise movement.

More particularly the side-plate 14 may be deleted and the cross-arm 16 directly connected to the yoke 13 and the slotted bolster plates 30 mounted on the arm 16 with the arm 16 also being sloted so as to receive the top edge of the saw blade 12 to support it against side thrust when the saw blade is manually moved sideways during its reciprocating movement.

Each leg 17 and 18 is equipped preferably with an arm 33 and 34 respectively for contacting the side face of the workpiece 21 similarly to the slide-plate 14. The spring-pressed roller guides 35 and 36 are respectively mounted on the feet 19 and 20 and are equipped with slots for the purpose of receiving the attaching screws 37 and 38 respectively so that the projection of the spring-pressed roller 40 is easily adjustable; the roller 40 turns on the axle 41 which rides in the slot 42 of the yoke 43 with the pin 44 holding the spring 45 in contact with the yoke 43.

In operating the device so far described, the user positions the device relative to a workpiece as shown in the drawings with the plate 14 and/or the slide arms 33 and 34 slidably disposed against the side face of the workpiece 21 with the saw 12 disposed above the edge face of the workpiece 21 but out of contact therewith initially as held thereabove by the spring-pressed rollers 40. The user then throws the switch 50 to the "on" position whereupon the saw 12 is rapidly reciprocated and the user then manually forces the device downwardly towards the edge face of the workpiece 21 so that the saw 12 is gradually engaged therewith and upon coming in contact a light saw cut is removed in the area of the saw 12, whereupon, the user slides the device including the saw blade 12 in light cutting relationship with the workpiece sidewise whereupon the saw blade removes a light cut of material to the extent to which the device has been moved sidewise. The user then moves the device and saw blade sidewise back and forth rapidly as he presses downwardly on the spring-pressed rollers 40 until the feet 19 and 20 come in contact with the edge face of the workpiece 21 whereupon the depth of the cut 22 is made as established by the preadjustment of the saw blade and feet thereby completely removing the material from the area 22. The width of the area of material removal is determined by the length of the saw blade used and the sidewise sliding movement of the saw blade determines the lengthwise extent of the routed out area 22. It will be further understood that the slotted cross bar 16 and bolster plates 30 house the blade 12 closely and support it against sidewise thrusts during the manual movement of the blade 12 during its rapid axial reciprocating sawing movement.

The spring-pressed rollers 40 permit hand pressure on the device to gradually engage the saw blade 12 which would not otherwise be obtained due to the fact that the saw blade 12 normally tends to bite into the workpiece and drag the saw into engagement therewith whereas with the rollers 40 a gradual sawing and chewing action of the saw can be manually controlled without the saw blade biting directly into the workpiece to chew out more than desired. With the spring-pressed rollers properly adjusted the user can press downwardly on the motor housing 10 to partially engage the saw blade 12 as he slides it sidewise thereby permitting light cuts by saw blade 12 during its reciprocating sidewise movement.

Referring now to the device seen in FIGS. 6 and 7, a guide assembly is provided having a back plate 51 and paired front plates 52 and 53 welded to the C clamps 54 and 55 with the back plate 51 welded thereto as at 56 and 57 and with the front plates 52 and 53 welded hereto as at 58 and 59. The feet 60 and 61 on the front plates 52 and 53 respectively abut the arms 33 and 34 on the bar 16, legs 17 and 18 limiting the sidewise sliding extent of the saw blade.

Thus if a carpenter, for example, desires to mount butt hinges on a door or series of many doors, he secures the plates 51, 52, and 53 on the door with the feet 60 and 61 spaced apart the desired distance to properly limit the length of area to be routed out. He then selects a saw blade of correct length so as to pre-determine the correct width of the area to be rounted out. He then adjusts the rollers 35 and 36 for the depth of cut desired and he is then ready to quickly route out the area to receive a butt hinge and it has been found that the same can be done repeatedly with ideal accuracy in 30 seconds to a minute for each butt hinge, constituting a great saving of time, labor, and money over previous methods and it has also been found that the routed out area is entirely accurate and without high or low spots.

The inventive routing tool fixture and power saw combination therewith and the length gage constitute a highly efficient advance in the art.

Although but a single embodiment of the invention has been shown and described in detail, it is obvious that many changes can be made in the size, shape, detail, and arrangements of the various elements of the structure within the scope of the appended claims.

I claim:

1. In combination, a guide plate having a face for sliding on a workpiece and a saw receiving aperture, a cantilevered saw blade projecting through said plate aperture, a motor secured to said plate, means driven by said motor connected to said saw blade for rapidly reciprocating said saw blade, a bar normal to said saw blade disposed across said guide plate and connected thereto having leg portions extending sidewise outwardly on either side of said saw blade, feet on said legs constituting a depthwise limit stop for said saw blade, and depressable spring-pressed rollers on said feet for riding a workpiece surface so as normally to hold said saw blade out of workpiece contact; said saw blade axial projection beyond said guide plate determining the widthwise extent of the saw cut; said saw blade being engageable with a workpiece by manually de-pressing said feet relative to said rollers to effect the depthwise extent of the saw cut; the manual running of said rollers on a workpiece effecting sidewise movement of said saw blade which in conjunction with rapid reciprocation of the saw blade effects material removal from the workpiece in the area over which it is manually moved sidewise.

2. In a device as set forth in claim 1, said spring-pressed rollers being adjustable relative to said feet for selectively positioning them for various depths of saw blade cuts.

3. In a device as set forth in claim 1, a bolster plate on said arm having a notch slidably receiving said saw blade supporting said saw blade against sidewise thrusts in its sidewise movement.

4. In a device as set forth in claim 1, arms projecting from said leg extending portions adjacent said feet each having a face lying in the plane of said guide plate face constituting slide guides remote from said saw blade for maintaining said saw level and preventing rocking on said guide plate.

5. In a device as set forth in claim 4, stops securable to a workpiece for contacting said arms for limiting the sidewise movement of said saw blade.

6. A fixture easily attachable to a motor powered reciprocating sabre saw tool having a cantilevered saw blade for adapting the same as a routing tool for accurately removing material from a workpiece over a desired area comprising a bar attachable to the saw tool normal to the saw blade having legs extending sidewise outwardly from the saw blade on either side thereof terminating in projecting ends, a foot on each said bar leg projecting end lying substantially parallel to the saw blade; said feet being adapted to contact a workpiece surface as guides and limit stops to determine the depthwise extent of material removal by the saw blade from a workpiece; said feet being adapted to slide over a workpiece surface in sidewise movement of the saw blade to permit the area lengthwise extent of material removal by the saw blade; the area widthwise extent of material removal by the saw blade being determined by the axial projection length of the saw blade; at least one transverse arm plate on said bar for contacting a workpiece surface for determining the axial extent of the saw blade; the depthwise extent of area material removal from a workpiece being governed by said feet bearing against a workpiece surface on either side of the area of material removal.

7. In a device as set forth in claim 6, spring-pressed rollers on said arms extending toward a workpiece surface and resiliently compressable thereagainst for engaging the saw blade with a workpiece.

8. In a device as set forth in claim 7, said rollers being adjustable to vary their extent of projection beyond said arms prior to compression.

References Cited in the file of this patent

UNITED STATES PATENTS

| | | |
|---|---|---|
| 1,425,152 | Viers | Aug. 8, 1922 |
| 1,644,666 | Carter | Oct. 11, 1927 |
| 2,348,406 | Ogren | May 9, 1944 |
| 2,676,624 | Gecmen | Apr. 27, 1954 |
| 2,693,208 | Stewart | Nov. 2, 1954 |
| 2,709,855 | Graham | June 7, 1955 |
| 2,801,655 | Zern | Aug. 6, 1957 |
| 2,854,761 | Graham | Oct. 7, 1958 |